(12) United States Patent
Cavazos Sepulveda et al.

(10) Patent No.: US 11,867,629 B2
(45) Date of Patent: Jan. 9, 2024

(54) 4D CHEMICAL FINGERPRINT WELL MONITORING

(71) Applicant: SAUDI ARABIAN OIL COMPANY, Dhahran (SA)

(72) Inventors: Adrian Cesar Cavazos Sepulveda, Garza Garcia (MX); Damian Pablo San Roman Alerigi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 134 days.

(21) Appl. No.: 17/217,069

(22) Filed: Mar. 30, 2021

(65) Prior Publication Data

US 2022/0316331 A1    Oct. 6, 2022

(51) Int. Cl.
*G01N 21/552* (2014.01)
*E21B 49/08* (2006.01)
*G01N 21/45* (2006.01)
*G01N 21/85* (2006.01)

(52) U.S. Cl.
CPC ....... *G01N 21/552* (2013.01); *E21B 49/0875* (2020.05); *G01N 2021/458* (2013.01); *G01N 2021/855* (2013.01)

(58) Field of Classification Search
CPC .............. E21B 49/0875; G01N 21/552; G01N 2021/3595; G01N 2021/458; G01N 2021/855; G01N 2201/082; G01N 2201/088; G01N 33/54373
See application file for complete search history.

(56) References Cited

U.S. PATENT DOCUMENTS 7,530,265 B2    5/2009   DiFoggio
8,445,841 B2    5/2013   Szobota et al.
8,735,803 B2    5/2014   Ford et al.
(Continued)

FOREIGN PATENT DOCUMENTS

WO    2014/102572 A1    7/2014
WO    2016/186669 A1    11/2016
WO    2020260928 A1    12/2020

OTHER PUBLICATIONS

M. Kraft et al. "New Frontiers for Mid-Infrared Sensors: Towards Deep Sea Monitoring with a Submarine FT-IR Sensor System" Applied Spectroscopy, vol. 57, No. 6; 2003 (12 pages).
(Continued)

*Primary Examiner* — Violeta A Prieto
(74) *Attorney, Agent, or Firm* — Osha Bergman Watanabe & Burton LLP (57) ABSTRACT

A sensing system for monitoring a composition of a downhole fluid in a well, where the sensing system includes: a light source, an optical waveguide, an evanescent field sensing element that is indirect contact with a downhole fluid, and a detector. The light source is operable for emitting a beam and includes a frequency comb generator configured to modify at least a portion of the beam into a sensing comb beam. The evanescent field sensing element provides attenuated internal reflection of the sensing comb beam at the interface between the evanescent field sensing element and the downhole fluid, and the portion of the sensing comb beam interacts with the fluid to form at least a portion of an interacted beam. The detector obtains a spectral distribution of the interacted beam.

13 Claims, 5 Drawing Sheets

(56) References Cited

U.S. PATENT DOCUMENTS

| | | | |
|---|---|---|---|
| 8,826,973 B2 | 9/2014 | Moxley et al. | |
| 9,322,775 B2* | 4/2016 | Gagliardi | G01J 3/02 |
| 10,502,863 B2 | 12/2019 | Mosse et al. | |
| 10,738,597 B2* | 8/2020 | Bhongale | G01J 3/44 |
| 2003/0223068 A1 | 12/2003 | DiFoggio et al. | |
| 2009/0296086 A1 | 12/2009 | Appel et al. | |
| 2010/0177310 A1* | 7/2010 | Difoggio | G01V 3/30 |
| | | | 73/152.55 |
| 2013/0032545 A1 | 2/2013 | Freese et al. | |
| 2015/0355086 A1* | 12/2015 | Gagliardi | G01J 3/2803 |
| | | | 356/326 |
| 2016/0223712 A1 | 8/2016 | Price et al. | |
| 2017/0242149 A1 | 8/2017 | Fujisawa et al. | |
| 2018/0073355 A1* | 3/2018 | Bhongale | G01J 3/0218 |
| 2018/0309941 A1* | 10/2018 | Lopez | H04N 23/11 |
| 2018/0313974 A1* | 11/2018 | Barfoot | G01V 8/24 |
| 2020/0018701 A1 | 1/2020 | Meyer et al. | |
| 2020/0363320 A1* | 11/2020 | Bhongale | E21B 47/135 |

OTHER PUBLICATIONS

A. Lambrecht et al. "Cylindrical IR-ATR Sensors for Process Analytics" MDPI, Sensors; May 21, 2020 (16 pages).

T. Schädle et al. "Fingerprinting Oils in Water via Their Dissolved VOC Pattern Using Mid-Infrared Sensors" American Chemical Society, Analytical Chemistry; Aug. 21, 2014; pp. 9512-9517 (6 pages).

International Search Report and Written Opinion issued in corresponding International Patent Application No. PCT/US2022/022588, dated Jun. 13, 2022 (12 pages).

* cited by examiner

4D CHEMICAL FINGERPRINT WELL MONITORING

BACKGROUND

The oil and gas industry is incorporating elements from the Fourth Industrial Revolution (4IR) into operations, especially comprehensive data acquisition to monitor and control a given process. Four dimensional (4D) chemical fingerprints well monitoring allows real-time monitor downhole fluids composition at certain depth of the well.

Monitoring the composition of downhole fluids allows prediction of oil type, water cut, and corrosive or toxic elements such as $H_2S$ or $CO_2$. Additional maintenance in logging operations may also be avoided. Further, it allows downhole fluids optimization when deployed simultaneously with inflow and injection control devices (ICD), by mitigating the water cut as well as corrosive or toxic elements.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a sensing system for monitoring a composition of a downhole fluid in a well, where the sensing system comprises a light source, a waveguide, an evanescent field sensing element that is indirect contact with a downhole fluid, and a detector. The light source is operable for emitting a beam and comprises a frequency comb generator configured to modify at least a portion of the beam into a sensing comb beam. The evanescent field sensing element provides attenuated internal reflection of the sensing comb beam at the interface between the evanescent field sensing element and the downhole fluid, and the portion of the sensing comb beam interacts with the fluid to form at least a portion of a fingerprint beam. The detector is configured to obtain a spectral distribution of the fingerprint beam.

In some embodiments, the detector of the sensing system may be a Fourier transform spectrometer.

In some embodiments, the waveguide is a hollow optical fiber.

In some embodiments, the light source of the sensing system may be an array of lasers or a wide-band light source capable of emitting light at infrared, visible, or ultraviolet wavelengths.

In some embodiments, the sensing system may further comprise a first optical switch, wherein the optical switch splits the beam into a reference beam and a sensing beam.

In some embodiments, each of the reference beam and the sensing beam may be modified by a frequency comb generator.

In some embodiments, the sensing system may further comprise a second optical switch that combines the sensing beam after interacting with the downhole fluid with the reference beam to form the interacted beam having an interferogram.

In some embodiments, the detector of the sensing system may be an opto-electrical detector configured to convert the fingerprint beam into an electrical signal.

In some embodiments, the sensing system may further comprise a digitizer configured to digitalize a signal from the detector for storage or transmission.

In some embodiments, the sensing system may further comprise a transmission line configured to transmit data or power, optically or electrically.

In some embodiments, the evanescent field sensing element may be a crystal with total or partial internal reflection, or an optical fiber, or other waveguide configurations.

In some embodiments, the evanescent field sensing element may be meta-surfaces or metamaterials.

In some embodiments, a surface of the evanescent field sensing element may be modified with a protective layer, a sensitivity enhancing layer or a self-cleaning layer.

In some embodiments, a surface of the evanescent field sensing element may be modified with meta-surfaces or metamaterials.

In one aspect, embodiments disclosed herein relate to a method of chemical fingerprints well monitoring. The method comprises: inserting a sensing system downhole to a desired depth, wherein the sensing system comprising an evanescent field sensing element that is in direct contact with a downhole fluid and provides partial or total internal reflection of a beam which interacts with the downhole fluid at an interface between the evanescent field sensing element and the downhole fluid; detecting spectral distribution of interacted beam to monitor a composition of the downhole fluid in real-time; and controlling an actuator with an inflow and injection control device (ICD) based on the composition of the downhole fluid.

In some embodiments, the method may further comprise analyzing spectral distribution of interacted beam using Fourier transform.

Other aspects and advantages of the claimed subject matter will be apparent from the following description and the appended claims.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein relate generally to four dimensional (4D) chemical fingerprints well monitoring systems and methods using frequency comb, Fourier transform spectrometer and evanescent field sensor. For example, the monitoring system may utilize dual-comb spectroscopy (DCS), Fourier transform infrared spectroscopy (FTIR), attenuated total reflectance (ATR), or any combination thereof for real-time in-depth monitoring of downhole fluids. Real-time in-depth monitoring of the downhole fluid composition, including the oil being produced, the water cut, and the presence of compounds that impact corrosion (e.g., $H_2S$ and $CO_2$), allows optimization of drilling parameters for maximum production and minimum maintenance.

Embodiments disclosed herein relate generally to systems and methods based on downhole deployment of evanescent field sensing element to analyze the chemical fingerprints of downhole fluids in real-time. An evanescent field sensing element is in direct contact with downhole fluids. An optical signal (i.e., a beam) may be partially or totally reflected inside the evanescent field sensing element. At the interface of the evanescent field sensing element and downhole fluids, an evanescent field directly interacts with downhole fluids, causing changes in the energy distribution (i.e., intensity) of the electromagnetic field (i.e., a sensing beam), and generating an absorption spectrum. Chemical characterization of the downhole fluids is performed by applying Fourier transform spectrometer (FTS) to the absorption fingerprints present in the spectrum.

Embodiments disclosed herein relate generally to utilizing optical frequency comb (OFC) for improved selectivity and sensitivity with ensured thermal and mechanical stability. OFC provides well-resolved absorption and dispersion spectra recorded simultaneously, providing sensitive detection of multiple chemical species over a broad spectral window. OFC may be utilized at a wide range of frequencies extending from the terahertz to the UV region. Its high spatial coherence allows for longer interrogation paths, higher sensitivity, high frequency resolution, and high accuracy. Aforementioned advantages may allow dynamic and real-time sensing with high speed of spectrum and data acquisition and instant feedback to control devices for optimization of oil production.

Figure 1:
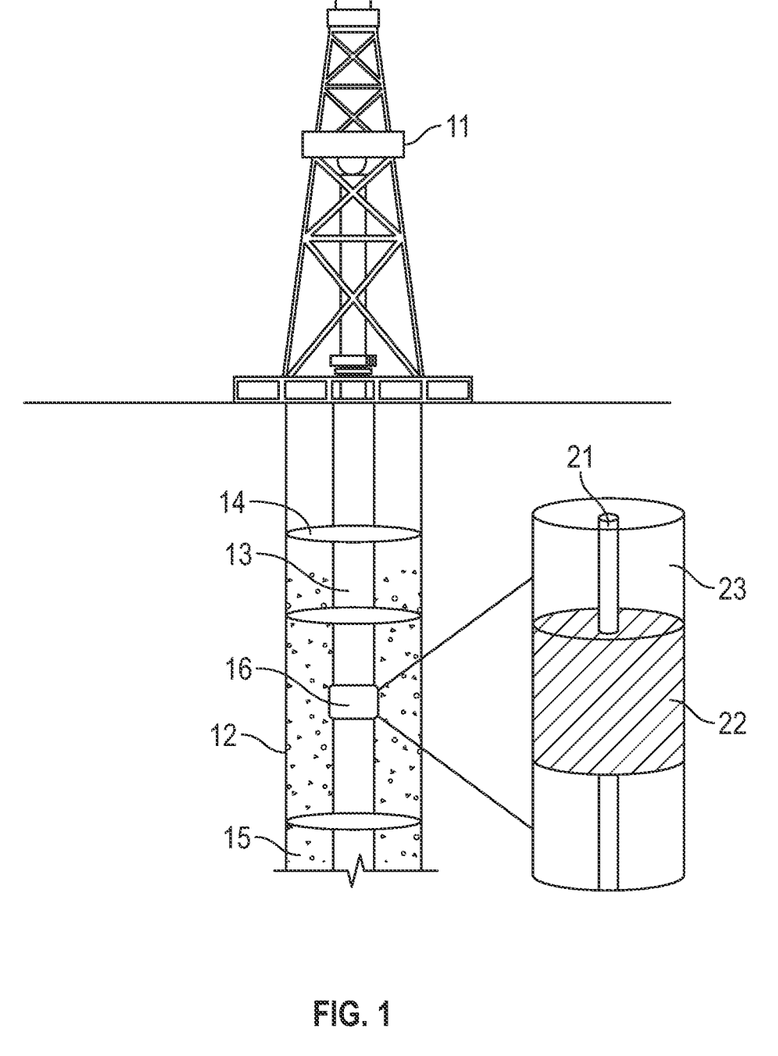
FIG. 1 shows a well comprising a sensing system according to embodiments of the present disclosure.

FIG. 1 shows the scheme of a derrick 11 and a well 12. There is at least one tubing 13 that is partially inside the well having at least one sensing system 16. The derrick includes a power module providing power for sensing and communication. The well may include at least one packer 14. The packers isolate the well into individual zones and allow selectively access and control. At least one sensing system is embedded inside the tubing and is distributed along the well to acquire the chemical fingerprints of downhole fluids 15 in real time.

In some embodiments, a plurality of sensing systems may be embedded inside one tubing, allowing real-time monitoring at different positions. In some embodiments, a plurality of tubings may be disposed inside the well. In such configuration, the number of tubings is limited by the diameter of the well.

The tubing according to embodiments of the present disclosure may include an actuator controlled by an inflow and injection control device (ICD) that restricts the flow. The ICD may be an electrical actuator, a fluid actuator, a mechanical actuator, or the like. The ICD may be positioned along the tubing.

In some embodiments, at least a portion of the tubing is on-ground inside the derrick. The sensing system inside the tubing may include a light source configured to generate optical signals at a single or multiple frequency, or a detector (e.g., spectrometer), or a communication device, or any combination thereof. The light source, the detector, the communication device, may be positioned on-ground or subterranean. The communication device receives the real-time chemical fingerprints monitoring results from the spectrometer and provide feedback information to the ICD for instant operation decisions based on the composition of produced oil in the well.

In some embodiments, the sensing system includes a data and/or power transmission line connected to the power module in the derrick. The data and/or power transmission line transmits optical and/or electrical signals and/or provides power to the sensing system. The data and/or power transmission line can be optical (e.g., waveguide, optical fiber, etc.), or electrical, or both.

The sensing system in FIG. 1 includes at least one waveguide 21 configured to transmit optical signals, at least one evanescent field sensing element 22, and cladding 23. The evanescent field sensing element, surrounded by cladding, is connected to the waveguide on both sides.

The waveguide may be an optical fiber, or any other material with increased refractive index for guiding optical signals. For example, the waveguide may be a hollow optical fiber (e.g., hollow silica or sapphire tube) filled with a gas (e.g., air, nitrogen, or helium) or a few-mode fiber. Alternatively, the waveguide may be a glass fiber (e.g., chalcogenide, fluoride), a (poly)crystalline fiber (e.g., silver halide, sapphire), or a solid waveguide (e.g., thin film planar GaAs/AlGaAs). In some embodiments, the sensing system may include a plurality of waveguides 21 each having a plurality of evanescent field sensing element distributed along the waveguide. In such configuration, the number of waveguides is limited by an outer diameter of the well.

The evanescent field sensing element provides total internal reflection of a beam and is in direct contact with downhole fluids. The interaction between the evanescent field of the beam and downhole fluids results in a spectral fingerprint of the downhole fluids. In other words, the interaction modifies the intensity and spectral distribution of the beam.

Figures 2A, 2B:
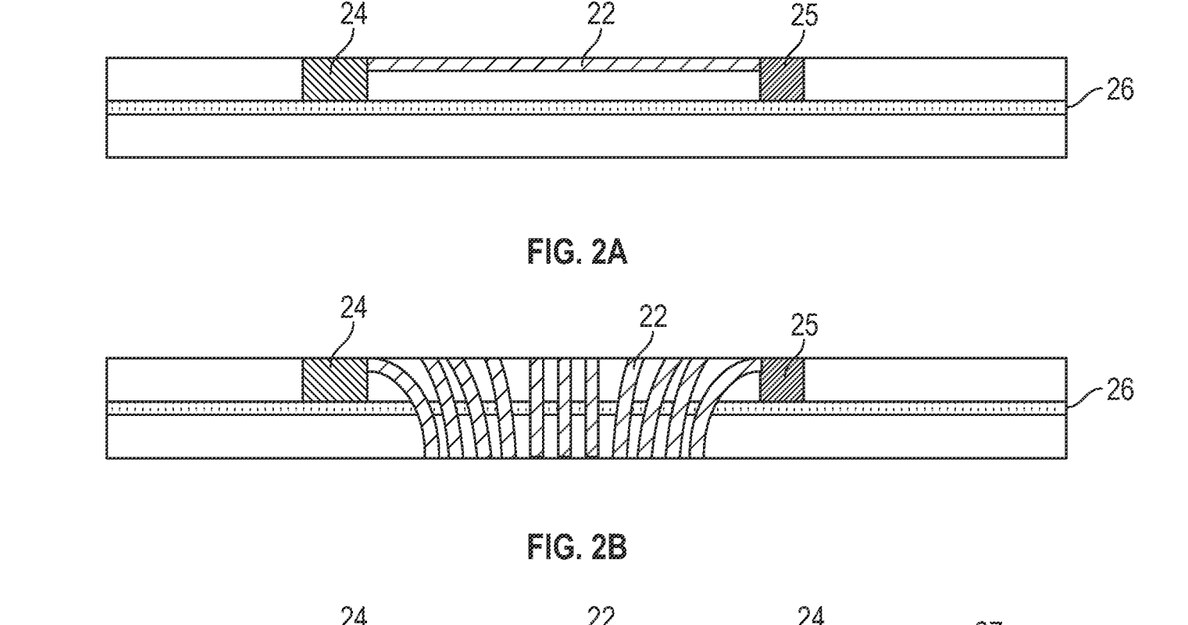
FIGS. 2A, 2B and 2C show the schemes of sensing systems according to embodiments of the present disclosure.
Figure 2C:
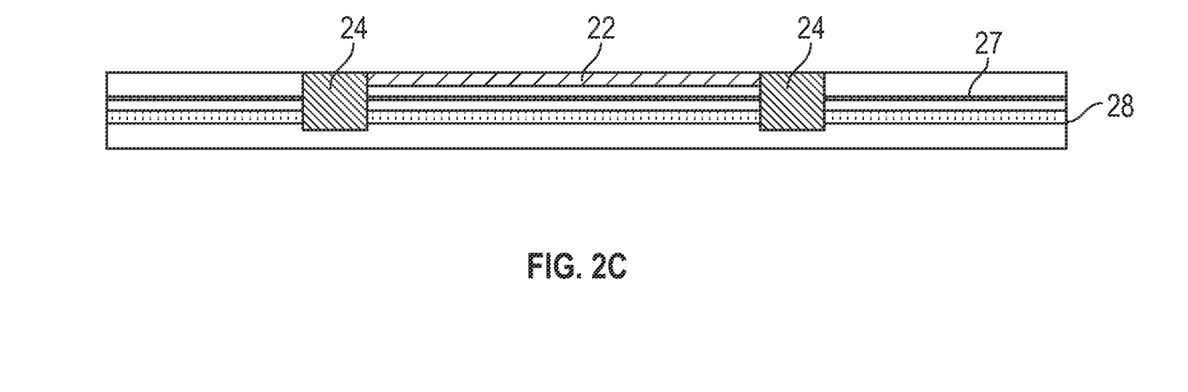

According to one or more embodiments of the present application, FIGS. 2A, 2B, and 2C show schemes of a portion of the sensing system showing the disposition of the evanescent field sensing elements. In some embodiments, the beam is guided directly from a light source to the evanescent field sensing elements for reaction at the interface. Alternatively, the beam may pass through an optical switch 24 or a beam splitter and split into a sensing beam guided to the evanescent field sensing element 22 for reaction and a reference beam. The length (or exposed area) of the evanescent field sensing element, in other word, the contact area between the evanescent field sensing element with downhole fluids, may influence the sensitivity of the sensing system. The interacted beam may be monitored in-situ by a detector 25 and the monitoring results may be transmitted to the ICD. Alternatively, the interacted beam may be reflected back and optically transmitted to a detector for analysis. In some embodiments, another optical switch may be used to recombine the reacted beam and the reference beam. A data and/or power transmission line 26 may be used for transmission of the power and/or beam before or after interaction. More specific, a hollow optical fiber 28 may be used. In some embodiments, at least one actuator 27 may be used to restrict the flow, controlled by an ICD.

In some embodiments, a beam that is guided to the evanescent field sensing element is a near-infrared (NIR) optical signal generated from a NIR light source. Alternatively, the beam may be an ultraviolet (UV) or visible light. Alternatively, the frequency of the beam may extend to the whole electromagnetic spectrum from X-ray to radio frequency (RF). The light source according to embodiments of the present disclosure may be a single band or a wide-band light source. A wide-band light source may be pulsed or continuous, including but not limited to, lasers, light-emitting diodes (LEDs), superluminescent diodes (SLEDs), blackbody radiators, plasma sources. The light source may be coupled with an electromagnetic wavelength selector, such as a dispersive, dichroic, or band-pass optical or electro-optical element, to select single or multiple frequencies.

If a coherent laser light source is used, a frequency comb generator (e.g., a resonator having resonant cavities) may be incorporated to generate a beam with frequency comb. In some embodiments, the beam with frequency comb beam is guided to the evanescent field sensing element and serves as a sensing beam. In some embodiments, the sensing system may include an optical switch, digital micromirror, filter, polarizer, or a beam splitter to split the beam generated from the light source and couple only a portion of the beam to the evanescent field sensing element as a sensing beam. The other portion of the beam that is not guided to the evanescent field sensing element serves as a reference beam. In some embodiments, both the sensing beam and the reference beam may couple to a resonator to generate frequency comb.

The sensing system according to embodiments of the present disclosure generally relates to ATR utilizing total internal reflection and resulted evanescent wave. When a beam (e.g., an IR beam) travels from a medium of high refractive index (i.e., evanescent field sensing element) to a medium of low refractive index (e.g., sample and surrounding medium) at an angle of incidence, at least a portion of the light is reflected back into the low refractive index medium. When an angle of incidence is greater than a particular angle, almost all the light is reflected back. When the beam passes through an evanescent field sensing element, it is reflected at least once off the internal surface at the interface with a sample. The result of the internal reflection is that a portion of the electromagnetic radiation from the beam propagating along the surface penetrates into the sample. The penetration depth into the sample is typically within micrometers, with the exact value determined by the wavelength of light, the angle of incidence, the indices of refraction for the evanescent field sensing element and the medium being probed. The number of reflections may be varied by varying the angle of incidence or the size of the evanescent field sensing element. At each position where internal reflection occurs, the evanescent wave penetrates with a decaying amplitude into the adjacent environment and interacts with the sample at the interface. The beam may then exit the evanescent field sensing element and be collected by a detector. The interacted beam may be conditioned or filtered for in-situ analysis or guided to the ground surface. For example, the interacted beam may be coupled back to a transmitting fiber or a telemetry fiber using a 2×1 coupler or another optical switch. The sensing beam after interaction may alternatively be captured by a detector embedded in the subterranean portion of the sensing system.

The evanescent field sensing element of embodiments of the present disclosure may be a few-mode or multimode optical fiber, or a crystal with total or partial internal reflection made of $SiO_2$, $F:SiO_2$, sapphire, or other materials as required for the application. The crystal used as evanescent field sensing element may also be germanium (Ge), zinc selenide (ZnSe), zinc sulfide (ZnS), thallium bromides (e.g., KRS-5), or silicon (Si). The excellent mechanical properties of diamond make it an ideal material as evanescent field sensing element, with the broad diamond phonon band between 2600 and 1900 $cm^{-1}$ significantly decreases signal-to-noise ratio at this region. The shape of the evanescent field sensing element depends on the type of spectrometer and nature of the sample. For example, when used together with dispersive spectrometers, the evanescent field sensing element may have a shape of a rectangular slab with chamfered edges. Other geometries may be prisms, trapezoid, rod, half-spheres, or thin films. Other waveguide configurations may be used, including but not limited to glass fibers (e.g., chalcogenides, fluorides), (poly)crystalline fibers (e.g., silver halides, sapphire), hollow waveguides (e.g., hollow silica or sapphire tubes), and solid waveguides (e.g., thin film planar GaAs/AlGaAs).

In some embodiments, metamaterials or meta-surfaces may be used as evanescent field sensing element materials. Metamaterials or meta-surfaces disclosed herein may include materials having zero or near-zero refractive index, negative refractive index, plasmonic properties, Fano-resonance, photonic bandgap, or phononic bandgap. The metamaterials or meta-surfaces may also be optical diodes, photonic crystals, tunable metamaterials. The metamaterials or meta-surfaces may be Moiré hyperbolic, bi-anisotropic, bi-isotropic, 2D chiral, 3D chiral or superlattice. Metamaterials or meta-surfaces may be pattern or fabricated using metals (e.g., gold, silver, platinum, rhodium), 2D materials (e.g., graphene, hexagonal boron nitride, metal dichalcogenides, phosphorene, MXenes) or metal organic frameworks. In some embodiments, metamaterials and meta-surfaces may be coated onto the evanescent field sensing element or the waveguide. Alternatively, the frequency comb generator may also be coated with metamaterials and meta-surfaces to enhance and/or tune its optical performance. The metamaterials and meta-surfaces may be patterned through various methods, including but not limited to laser ablation, plasma etching, chemical etching, and lithography. Alternatively, a deposition method may be performed by sputtering, pulsed laser deposition, pulsed plasma deposition, atomic layer deposition, atomic layer etching, electroplating, e-beam evaporation, chemical vapor deposition, surface exsolution, or slurry coating.

Figure 3A:
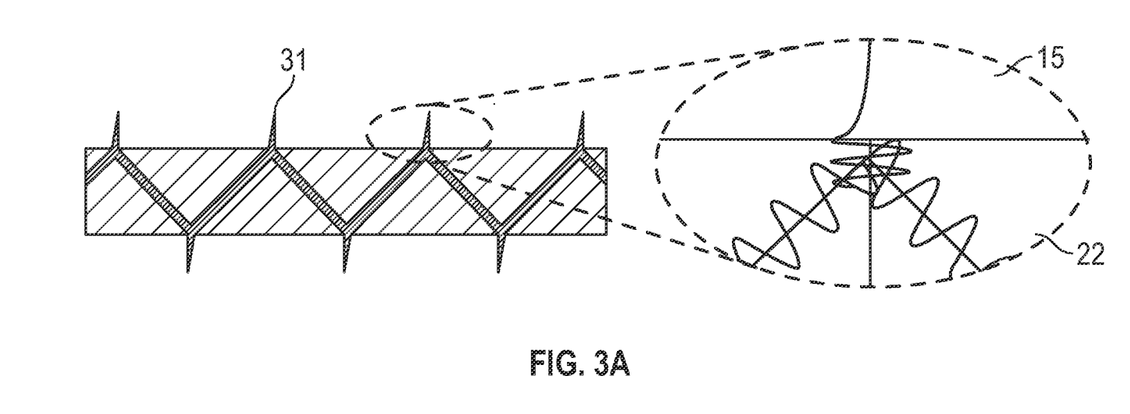
FIGS. 3A and 3B show disposition of an evanescent field sensing element according to embodiments of the present disclosure.
Figure 3B:
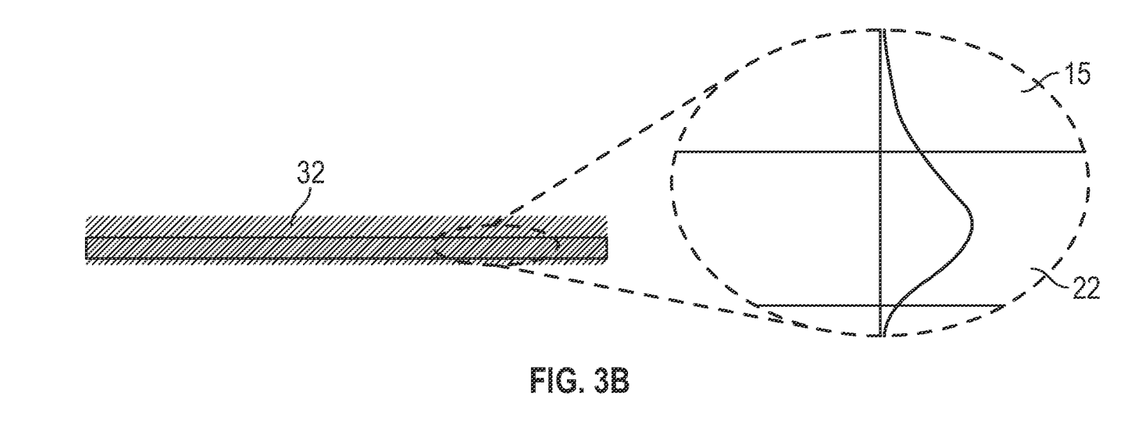

When metamaterials and meta-surfaces are used as the evanescent field sensing element, they may generate a linear or planar distributed evanescent wave instead of a point distribution. For example, FIGS. 3A and 3B show disposition of an evanescent field sensing element according to embodiments of the present disclosure. Other types of evanescent field sensing element may generate a discrete evanescent field 31 at each position where total internal reflection occurs, while the continuous evanescent field 32 from metamaterials and meta-surfaces is evenly distributed at the interface between the evanescent field sensing element 22 and downhole fluids 15. As such, metamaterials and meta-surfaces allows enhanced conversion of electromagnetic waves into evanescent waves and improved sensibility and responsivity of the interaction between the downhole fluids with the evanescent field sensing element.

In some embodiments, a modification layer may be coated, added, or patterned to modify the surface of the evanescent field sensing element or the waveguide. The modification layer may be a protective layer, a sensitivity enhancing layer, a self-cleaning layer, or a combination thereof. The modification layer may be made of polymers, ceramics, oxides, diamond, metals, metamaterials, or other materials as required by their functions. The sensitivity enhancing layer may be a thin film that modifies the propagation of evanescent waves and enhances sensing capabilities by providing continuous evanescent wave along the waveguide surface and avoid generation of discrete evanescent waves. The thickness of the modification layer may be adjusted accordingly as needed. A self-cleaning layer may be coated to improve stability and durability of evanescent field sensing element or the waveguide. Under extreme conditions, for example measurements in a well of oil production, a robust sensing system is required for sampling and analysis. A self-cleaning material treated surface is configured to be omniphobic or super omniphobic so that repels water and oil or switchable between hydrophobic and oleophobic, minimizing the damage from hazardous and extreme environments.

Embodiments of the present disclosure may include a detector. The detector may be a dispersive spectrometer allowing detection at different wavelengths. The dispersive spectrometer may couple with virtual imaging phase array (VIPA) to achieve a time resolution at microseconds, allowing dynamic and real-time monitoring of chemical fingerprints. Alternatively, when lasers are used, a single detector without dispersive elements may be sufficient. The detector may also be a cooled (solid state) or uncooled photodiode or a photoelectric sensor. The type of detector depends primarily on the range of wavelengths to be measured. For example, silicon-based charge-coupled devices (CCDs) are suitable for UV, visible, and the shorter end of the IR range. For detection at longer wavelengths, an IR detector may be used. The IR detector include photodetectors (photon detectors) which are sensitive in a relatively long wavelength region, and thermal detectors based on sensing small temperature changes induced by absorption of IR light. For longer wavelengths, semiconductor materials with a lower band gap energy are required, so that photons with lower energy are sufficient to create a carrier which contribute to some photocurrent. Indium gallium arsenide (InGaAs) detectors are suitable for wavelengths up to $\approx 1.7$ μm. Similarly, germanium (Ge) photodiodes can be used at about 0.9 μm to 1.6 μm. For longer wavelengths even beyond 5 μm, indium antimonide (InSb) photodiodes are suitable. The IR detector may be a mercury cadmium telluride (MCT) detector, quantum dot infrared photodetectors (QDIPs), or quantum well infrared photodetectors (QWIPs) based on GaAs/AlGaAs. A thermal IR detector may include pyroelectric detectors based on ferroelectric materials such as lithium tantalate, or bolometers containing a thin IR-absorbing plate made of amorphous silicon or vanadium oxide. Alternatively, detectors with up converting crystals, such as lithium niobite, or nanoparticles could be used as sensors with lower temperature noise sensitivity.

Figure 4:
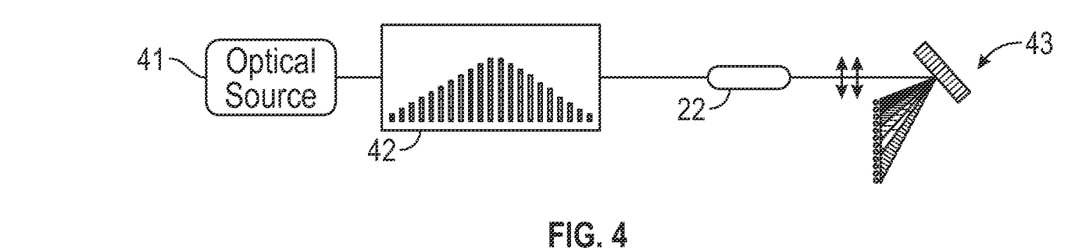
FIG. 4 shows a sensing system according to embodiments of the present disclosure used with at least one frequency comb.

As described above, a pulsed laser light source may incorporate a frequency comb generator to obtain a beam with frequency comb. Frequency comb allows real-time monitoring of produced oil composition, as well as the water cut and corrosive or toxic elements elements, at high speed and high sensitivity. FIG. 4 shows a sensing system according to embodiments of the present disclosure used with at least one frequency comb.

A coherent light source such as a frequency comb enables higher brightness, increased signal-to-noise ratio, and decreased measurement time. In some embodiments, the beam generated from the light source 41 may couple to at least one frequency comb generator 42 (e.g., resonator) to generate the frequency comb. The spectrum of the frequency comb beam has a series of discrete, equally spaced frequency lines, and the intensity of comb lines may vary substantially. The frequency comb beam may be generated by periodic modulation (in amplitude and/or phase) of a continuous-wave laser, four-wave mixing in nonlinear media, or stabilizing a train of pulses generated by a mode-locked laser. For example, a non-linear optical resonator having resonant cavities can be used in conjunction with pulsed laser sources to generate a frequency comb. The non-linear optical resonator can non-linearly transform light from a continuous laser with a single frequency to a comb light with multiple frequencies.

The frequency comb beam is directed to the evanescent field sensing element 22 for interaction with downhole fluids. The interacted beam is then captured by a dispersive spectrometer 43 allowing detection at different wavelengths. The dispersive spectrometer may couple with virtual imaging phase array (VIPA) to achieve a time resolution at microseconds, allowing dynamic and real-time monitoring of chemical fingerprints.

Figure 5:
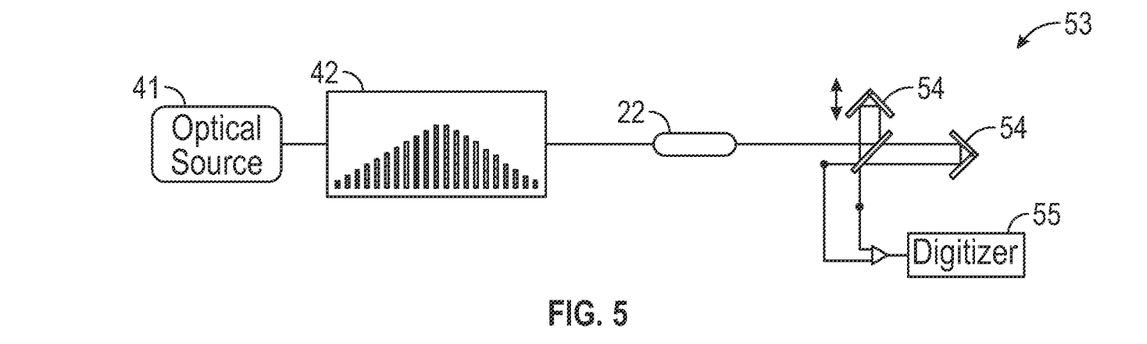
FIG. 5 shows a sensing system according to embodiments of the present disclosure used with at least one frequency comb and Fourier transform spectrometer (FTS).

In some embodiments, a Fourier transform spectrometer (FTS) may be utilized as a detector. The optical spectrum with chemical fingerprints is the Fourier transform of the interferogram in time-domain interference waveform. Laser arrays or wide-band light sources, capable of switching rapidly through fibers of different length, may provide the time delay required to capture the time-domain interferogram for FTS. For example, FIG. 5 shows a sensing system based on frequency comb in combination with Fourier transform spectrometer. The beam generated from the light source 41 may couple to at least one frequency comb generator (e.g., resonator) 42 to generate the frequency comb. The frequency comb beam containing many frequencies of light at once is directed to the evanescent field sensing element 22 for interaction with downhole fluids at the interface. The beam is modified by the interaction at the interface due to absorption of downhole fluids, indicating chemical fingerprints for real-time monitoring. This process is rapidly repeated many times over a short time span. Afterwards, the interacted beam is directed to an FTS 53 with a plurality of mirrors on movable arms 54 for analysis.

FTS is a measurement technique that acquires spectra (transmission, reflectance, or absorbance) based on measurements of the coherence of a radiative source, using time-domain or space-domain measurements of the electromagnetic radiation or other type of radiation. A Fourier transform is applied to turn raw data into an actual spectrum, and in many of the cases in optics involving interferometers. For example, FTS may use an interferometer to generate a wideband interferogram in the time-domain whose Fourier transform is the optical spectrum. FTS may be applied to a variety of spectroscopic technologies including optical spectroscopy, infrared spectroscopy (FTIR), nuclear magnetic resonance (NMR), magnetic resonance spectroscopic imaging (MRSI), mass spectrometry and electron spin resonance spectroscopy.

In some embodiments, FTS includes a scanning Michelson interferometer that measures on a single photo detector the interference between the two time-delayed signals from the two arms as a function of the optical path difference. A beam used herein may be generated by starting with a broadband light source containing the full spectrum of wavelengths to be measured. The time-domain interferogram may be obtained by a scanning Michelson interferometer with mirrors on movable arms. The interacted beam shines into the Michelson interferometer containing a certain configuration of mirrors, at least one of which is moved by a motor. As this mirror moves, each wavelength of light in the beam is periodically blocked, transmitted, blocked, transmitted, by the interferometer, due to wave interference. Different wavelengths are modulated at different rates, so that at each moment or mirror position the beam coming out of the interferometer has a different spectrum.

According to embodiments of the present disclosure, FTIR is combined with ATR for detection and analysis in the IR spectral region, with advantages over conventional IR spectroscopy. FTS may combine with ATR in other spectral ranges. For example, when ultraviolet (UV) or visible light is used, the evanescent light path is sufficiently short such that interaction between the evanescent wave and the sample is decreased with wavelength. For optically dense samples, this may allow measurements in UV range.

In some embodiments, a digitizer 55 may be used in addition to digitalize the signals obtained from the detector for storage or transmission to surface through the data and/or power transmission line. The data and/or power transmission line could be electrical, optical, or a combination thereof. Optionally, data processing may be conducted downhole either electronically or optical and stored in-situ using a storage unit.

Figure 6:
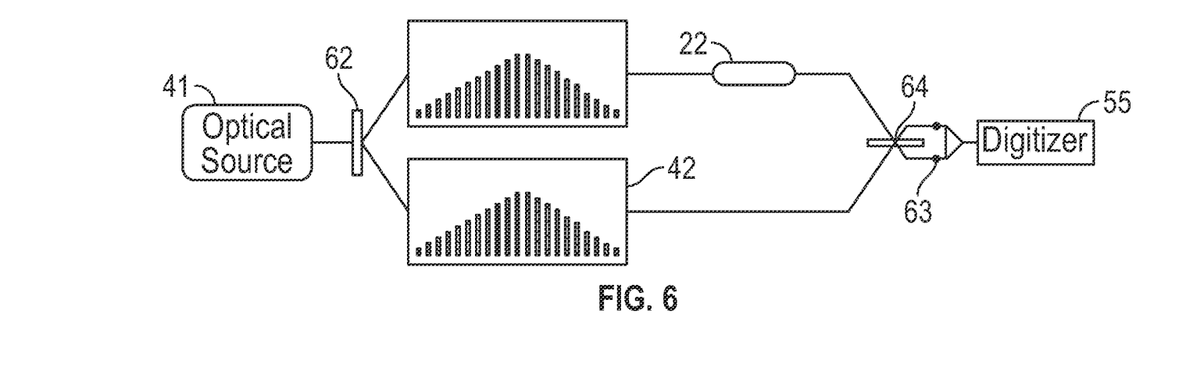
FIG. 6 shows a sensing system according to embodiments of the present disclosure used with dual-comb configuration.

In some embodiments, the sensing system may include two or more frequency combs for measurement, namely dual-comb spectroscopy (DCS). DCS is a two-comb approach without the need of moving arms. For example, as shown in FIG. 6, the beam generated from the light source 41 splits into a reference beam and a sensing beam by an optical switch 62 (alternatively a beam splitter). Each of the reference beam and the sensing beam are modified by a resonator 42 (e.g., Kerr frequency comb microresonator) to generate a reference comb beam and a sensing comb beam. The sensing comb beam is guided to the evanescent field sensing element 22 for interaction with downhole fluids. The interaction modifies the intensity and spectral distribution of the sensing comb beam causing a slightly different repetition frequency. The reference comb beam and the interacted sensing comb beam are subsequently recombined using a recombiner 64 (e.g., another optical switch), generating a recombined beam with an interferogram spectrum that interferes with both the sensing comb beam and the reference comb beam. The recombined beam is recorded as a function of time and it is Fourier transformed to reveal the spectrum. It may be analyzed in-situ by a detector 63 or coupled back to a telemetry fiber or a feeding fiber for analysis at ground. In both cases, the line spacing of the interferogram spectrum is converted to an radio frequency (RF) signal whose signatures reflect the chemical fingerprints of downhole fluids. The information containing the fingerprints is then feedback to the ICD for control and optimization.

In some embodiments, the sensing comb beam, after interaction, may be converted to an electrical signal for analysis via an opto-electrical detector or an array thereof (e.g., thermopile, photodetector, pyroelectric detector, electrocaloric detector, microbolometer, diode, pyrometer, or radiometer). A digitizer 55 may be used in addition to digitalize the signals obtained from the detector for storage or transmission to surface through the data and/or power transmission line. The data and/or power transmission line could be electrical, optical, or a combination thereof. Optionally, data processing may be conducted downhole either electronically or optical and stored in-situ using a storage unit.

Figure 7:
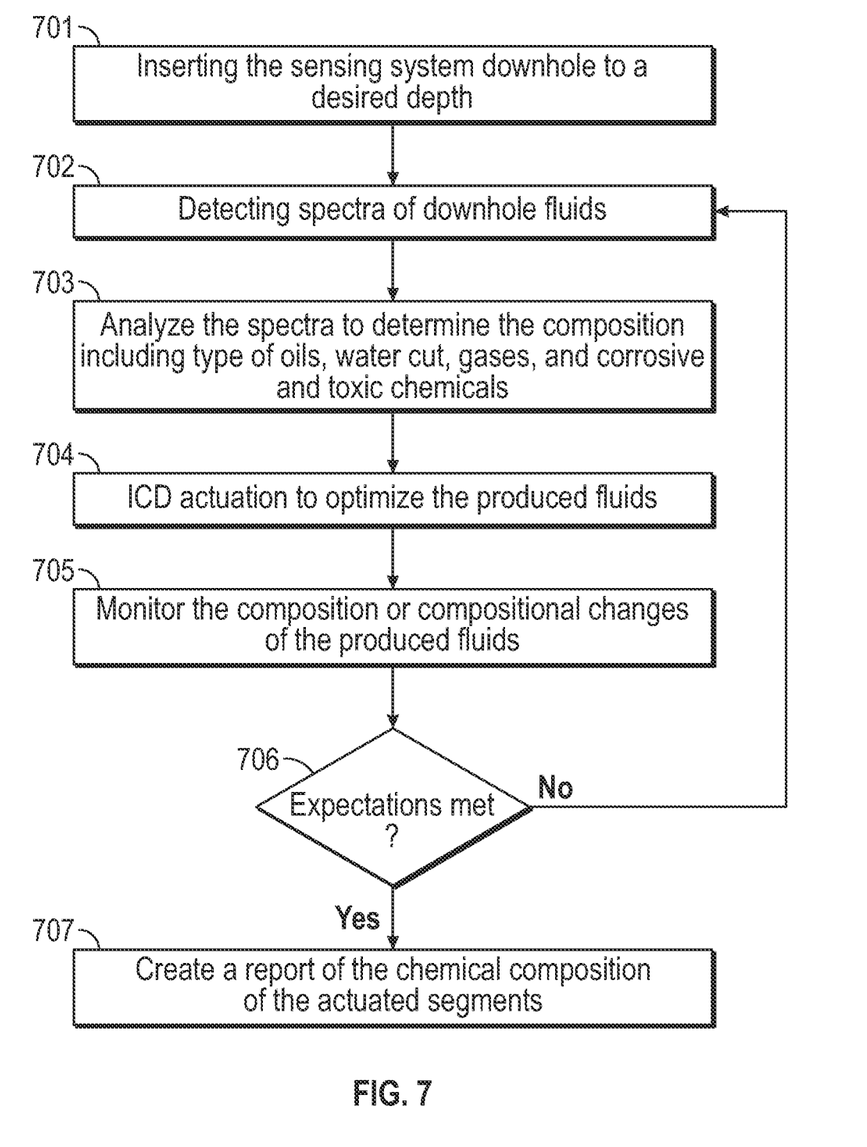
FIG. 7 shows a method of chemical fingerprints well monitoring according to embodiments of the present disclosure.

The sensing system according to embodiments of the present disclosure may include a communication device that receives the real-time chemical fingerprints monitoring results from the detector and provide feedback information to the ICD for instant operation decisions based on the composition of produced oil in the well. According to embodiments of the present disclosure, a method of chemical fingerprints well monitoring is shown in FIG. 7. At step 701, the sensing system is inserted downhole to a desired depth. At least one beam is guided to the evanescent field sensing element using a waveguide. The beam may be generated from a light source disposed on-ground or subterranean, and optionally pass through an optical switch, a frequency comb generator, or both. A plurality of beams, either used for reference or for sensing, may be employed. The beam interacts with downhole fluids at an evanescent field generated at the interface of the evanescent field sensing element and downhole fluids. Step 702 includes a step of detecting the spectra of downhole fluids. The interacted beam is directed to a detector, either in-situ or on-ground, to capture the chemical fingerprints in real-time. At step 703, the obtained data (e.g., spectra) is analyzed to determine the composition of downhole fluids, including type of oils, water cut, gases, and corrosive and toxic chemicals. At step 704, a communication device sends the monitoring results to the ICD and the ICD controls actuation to optimize the produced downhole fluids. At step 705, the composition or compositional changes of the produced downhole fluids is monitored in real-time. A determination of whether the expected composition is achieved is made at step 706 based on the monitoring results. If the expectation is met with regard to the composition of produced downhole fluids, a report may be created of the chemical composition of the actuated segments. Otherwise, real-time monitoring may continue by circle back to step 702.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

REFERENCE LIST 11 derrick
12 well
13 tubing
14 packer
15 downhole fluid
16 sensing system
21 waveguide
22 evanescent field sensing element
23 cladding
24 optical switch
25 detector
26 data and/or power transmission line
27 actuator
28 hollow optical fiber
31 discrete evanescent field
32 continuous evanescent field
41 light source
42 frequency comb generator
43 dispersive spectrometer
53 Fourier transform spectrometer
54 mirrors on movable arms
55 digitizer
62 optical switch
63 detector
64 recombiner

What is claimed:

1. A sensing system for monitoring a composition of a downhole fluid in a well, the sensing system comprising:
at least one light source, having at least one frequency comb generator, that emits a beam;
a first optical switch configured to split the beam into a reference beam and a sensing beam;
a waveguide;
an evanescent field sensing element that is in direct contact with the downhole fluid, wherein
the frequency comb generator is configured to modify the reference beam into a reference comb beam and to modify the sensing beam into a sensing comb beam,
the evanescent field sensing element is configured to provide attenuated internal reflection of the sensing comb beam at an interface between the evanescent field sensing element and the downhole fluid,
the sensing comb beam interacts with the downhole fluid to form at least a portion of an interacted beam;
a second optical switch that combines the sensing comb beam after interacting with the downhole fluid and the reference comb beam to form the interacted beam having an interferogram, wherein
the downhole fluid is arranged between the first optical switch and the second optical switch, and
the sensing comb beam interacts with the downhole fluid at the evanescent field sensing element, and the reference comb beam bypasses the downhole fluid, and
a detector configured to obtain a spectral distribution of at least one of the following: the beam, the sensing comb beam, the reference comb beam, the interacted beam, or a combination thereof.

2. The sensing system according to claim 1, wherein the detector is a Fourier transform spectrometer.

3. The sensing system according to claim 1, wherein the waveguide is a hollow optical fiber.

4. The sensing system according to claim 1, wherein the light source is an array of lasers or a wide-band light source capable of emitting light at infrared, visible, or ultraviolet wavelengths.

5. The sensing system according to claim 1, wherein the detector is an opto-electrical detector configured to convert the interacted beam into an electrical signal.

6. The sensing system according to claim 1, further comprising a digitizer configured to digitalize a signal from the detector for storage or transmission.

7. The sensing system according to claim 1, further comprising a transmission line configured to transmit data or power, optically or electrically.

8. The sensing system according to claim 1, wherein the evanescent field sensing element is at least one of the following: crystals with or total or partial internal reflection, fiber optics, waveguides, meta-surfaces, metamaterials, or combinations thereof.

9. The sensing system according to claim 1, wherein a surface of the evanescent field sensing element is modified with at least one of the following: a protective layer, a sensitivity enhancing layer, a self-cleaning layer, or combinations thereof.

10. The sensing system according to claim 1, wherein a surface of the evanescent field sensing element is modified with at least one of the following: crystals with or total or partial internal reflection, fiber optics, waveguides, meta-surfaces, metamaterials, or combinations thereof.

11. A cable comprising a plurality of sensing systems as described in claim 1.

12. A method for well monitoring, the method comprising:
inserting a sensing system downhole to a desired depth, wherein the sensing system comprising an evanescent field sensing element that is in direct contact with a downhole fluid and provides partial or total internal reflection of a beam which interacts with the downhole fluid at an interface between the evanescent field sensing element and the downhole fluid;
wherein the sensing system comprises:
at least one light source, having at least one frequency comb generator, that emits the beam;
a first optical switch configured to split the beam into a reference beam and a sensing beam;
a waveguide;
wherein the frequency comb generator is configured to modify the reference beam into a reference comb beam and to modify the sensing beam into a sensing comb beam,
wherein the sensing comb beam interacts with the downhole fluid to form at least a portion of an interacted beam;
a second optical switch that combines the sensing comb beam after interacting with the downhole fluid and the reference comb beam to form the interacted beam having an interferogram,
wherein the downhole fluid is arranged between the first optical switch and the second optical switch,
wherein the sensing comb beam interacts with the downhole fluid at the evanescent field sensing element, and the reference comb beam bypasses the downhole fluid, and
a detector configured to obtain a spectral distribution of at least one of the following:

the beam, the sensing comb beam, the reference comb beam, the interacted beam, or a combination thereof;

detecting, by the detector, spectral distribution of the interacted beam to monitor a composition of the downhole fluid in real-time; and controlling an actuator with an inflow and injection control device (ICD) based on the composition of the downhole fluid.

13. The method according to claim 12, further comprising:

analyzing spectral distribution of interacted beam using Fourier transform.

* * * * *